(12) United States Patent
Wang

(10) Patent No.: US 12,732,025 B2
(45) Date of Patent: Sep. 8, 2026

(54) WIRELESS CHARGER FOR WEARABLE DEVICE AND WIRELESS CHARGING SYSTEM

(71) Applicant: Huawei Technologies Co., Ltd., Shenzhen (CN)

(72) Inventor: Le Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 695 days.

(21) Appl. No.: 18/250,640

(22) PCT Filed: Sep. 6, 2021

(86) PCT No.: PCT/CN2021/116741
§ 371 (c)(1),
(2) Date: Apr. 26, 2023

(87) PCT Pub. No.: WO2022/089001
PCT Pub. Date: May 5, 2022

(65) Prior Publication Data

US 2023/0402877 A1 Dec. 14, 2023

(30) Foreign Application Priority Data

Oct. 27, 2020 (CN) ......................... 202011163263.6

(51) Int. Cl.
*H01M 10/46* (2006.01)
*H02J 7/70* (2026.01)
*H02J 50/12* (2016.01)

(52) U.S. Cl.
CPC ............. *H02J 50/12* (2016.02); *H02J 7/731* (2026.01)

(58) Field of Classification Search
CPC ...... H02J 7/731; H02J 7/70; H02J 7/02; H02J 50/12; H02J 50/005; H02J 50/10; H02J 2207/20

(Continued)

(56) References Cited

U.S. PATENT DOCUMENTS 8,564,243 B2 * 10/2013 Chen ......................... H02J 7/70 320/108
2012/0223673 A1 * 9/2012 Chen ......................... H02J 7/70 320/108

(Continued)

FOREIGN PATENT DOCUMENTS

CN 205681163 U 11/2016
CN 107370252 A 11/2017

(Continued)

OTHER PUBLICATIONS

Machine translation of WO2021082907A1 (May 6, 2021) (Year: 2021).*

*Primary Examiner* — Edward Tso
(74) *Attorney, Agent, or Firm* — Slater Matsil, LLP

(57) ABSTRACT

A wireless charger includes a charging base, a connector, and a cable. The charging base is connected to the connector through the cable. The charging base includes a first housing and a transmitting coil disposed in the first housing. The wireless charger further includes a boost circuit and an inverter circuit. The boost circuit is disposed outside the first housing, and is configured to boost a direct current voltage signal input through the connector. The inverter circuit is disposed between the boost circuit and the transmitting coil, and is configured to convert a boosted direct current voltage signal into an alternating current voltage signal, and transmit the alternating current voltage signal to the transmitting coil. The transmitting coil is configured to convert electric energy (Continued)

of the alternating current voltage signal into electromagnetic energy for wireless transmission.

20 Claims, 9 Drawing Sheets

(58) Field of Classification Search
USPC ................................ 320/107, 108, 114, 115
See application file for complete search history.

(56) References Cited

U.S. PATENT DOCUMENTS

| | | | | |
|---|---|---|---|---|
| 2016/0211694 | A1 | 7/2016 | Wang et al. | |
| 2017/0201107 | A1* | 7/2017 | Yang ...................... | H02J 7/975 |

FOREIGN PATENT DOCUMENTS

| | | | | |
|---|---|---|---|---|
| CN | 207559624 | U | 6/2018 | |
| CN | 207705870 | U | 8/2018 | |
| CN | 207801584 | U | 8/2018 | |
| CN | 208142932 | U | 11/2018 | |
| CN | 209217746 | U | 8/2019 | |
| CN | 110829552 | A | 2/2020 | |
| CN | 111293789 | A | 6/2020 | |
| CN | 210839034 | U | 6/2020 | |
| WO | 2015101189 | A1 | 7/2015 | |
| WO | WO-2021082907 | A1 * | 5/2021 | ............. H02J 50/12 |

* cited by examiner

WIRELESS CHARGER FOR WEARABLE DEVICE AND WIRELESS CHARGING SYSTEM

CROSS-REFERENCE TO RELATED APPLICATIONS

This application is a National Stage of International Application No. PCT/CN2021/116741, filed on Sep. 6, 2021, which claims priority to Chinese Patent Application No. 202011163263.6, filed on Oct. 27, 2020. Both of the aforementioned applications are hereby incorporated by reference in their entireties.

TECHNICAL FIELD

This application relates to the field of wireless charging technologies, and in particular, to a wireless charger for a wearable device and a wireless charging system.

BACKGROUND

In wireless charging technologies, an electronic device can be charged without being connected to a wireless charger through a power cable but only being placed on the wireless charger. This brings convenience to a user. In addition, a contact terminal configured to connect to the power cable may be omitted on the electronic device, and security and waterproof and dustproof performance of the electronic device can be improved. Therefore, in recent years, charging the electronic device by using wireless charging technologies has become increasingly popular.

As wireless charging is gradually popularized on low-power electronic devices (wearable devices such as a smart band, a smartwatch, or a smart ring), users also have higher requirements on user experience. In wireless charging, charging efficiency is a key parameter that affects user experience. In case of same input power, higher charging efficiency indicates higher output power, so that an electronic device can be quickly charged, to reduce charging duration and improve user experience.

However, as charging power increases, a heat consumption problem of the wireless charger becomes increasingly prominent, and becomes a main bottleneck for improving a charging speed.

SUMMARY

This application provides a wireless charger for a wearable device and a wireless charging system, to improve charging efficiency of the wireless charging system.

According to a first aspect, this application provides a wireless charger for a wearable device. The wireless charger includes a charging base, a connector, and a cable. The charging base is connected to the connector through the cable. The charging base includes a first housing and a transmitting coil disposed in the first housing. The wireless charger further includes a boost circuit and an inverter circuit. The boost circuit is disposed outside the first housing, and is configured to boost a direct current voltage signal input through the connector. The boost circuit, the inverter circuit, and the transmitting coil are electrically connected. The inverter circuit is disposed between the boost circuit and the transmitting coil, and is configured to convert a boosted direct current voltage signal into an alternating current voltage signal, and transmit the alternating current voltage signal to the transmitting coil. The transmitting coil is configured to convert electric energy of the alternating current voltage signal into electromagnetic energy for wireless transmission.

According to the wireless charger in this application, the boost circuit is disposed to boost a direct current voltage input to the wireless charger through the connector, so that when charging power is effectively increased, a current flowing through a power supply circuit of the wireless charger can be low and heat consumption of the transmitting coil can be effectively reduced. In addition, in this application, the boost circuit is disposed outside the first housing of the charging base. When the wireless charger is used to charge a low-power electronic device like a smartwatch, a smart band, or smart glasses, total heat consumption generated by a heat emitting element in the charging base that is in direct contact with the to-be-charged electronic device is low, and temperature rise of the charging base is slow. This can avoid triggering thermal protection that limits charging of the charging base, and effectively reduce charging duration, to improve charging efficiency. In addition, when the wireless charger is used to charge the electronic device, discomfort generated when a user touches the electronic device or the wireless charger can be reduced, to improve charging security of the wireless charger, and improve charging experience of the user.

In a possible implementation of this application, when the connector is specifically disposed, the connector may include a connector interface and a second housing. A part or all of the connector interface is disposed in the second housing. In this way, the connector interface can be directly inserted into a charging interface, or be electrically connected to the charging interface after being inserted into an adapter, so that the connector is connected to a direct current power supply.

Because the boost circuit is configured to boost the direct current voltage signal input through the connector, in a possible implementation of this application, the boost circuit may be disposed in the second housing, and the boost circuit is electrically connected to the connector interface. Because the user does not frequently contact the connector in a process of charging the electronic device by using the wireless charger, disposing the boost circuit in the second housing of the connector can help reduce a possibility that the user is burnt when using the wireless charger, and help improve user experience.

In a possible implementation of this application, when the inverter circuit is specifically disposed, both the inverter circuit and the heat emitting coil may be disposed in the first housing. Because total heat consumption generated by the transmitting coil and the inverter circuit in the charging base that is in direct contact with the to-be-charged electronic device is low, and temperature rise of the charging base is slow. This can avoid triggering thermal protection that limits charging of the charging base, and effectively reduce charging duration, to improve charging efficiency.

In addition, when the connector has the second housing, both the inverter circuit and the boost circuit may be disposed in the second housing that is not frequently contacted by the user and that is of the connector. The transmitting coil is separately disposed in the first housing of the charging base, and the boost circuit and the inverter circuit are disposed in the second housing of the connector. When the wireless charger is used to charge an electronic device, total heat consumption generated by the transmitting coil in the charging base that is in direct contact with the to-be-charged electronic device is low, and temperature rise of the charging base is slow. This can avoid triggering thermal protection that limits charging of the charging base, and effectively reduce charging duration, to improve charging efficiency. In addition, when the wireless charger is used to charge the electronic device, discomfort generated when a user touches the electronic device or the wireless charger can be reduced, to improve charging security of the wireless charger, and improve charging experience of the user.

In addition to the foregoing disposition manners, in some other implementations of this application, the wireless charger further includes a third housing. The third housing is disposed between the first housing and the second housing. The first housing is connected to the third housing through the cable, and the second housing is connected to the third housing through the cable. In this implementation, the inverter circuit may be disposed in the third housing, and the boost circuit may be disposed in the second housing of the connector. In this way, the boost circuit can boost a direct current voltage input through the connector interface, and then the inverter circuit converts a direct current power supply boosted by the boost circuit, to implement an objective of charging with a high voltage and a low current by using the wireless charger. According to this solution, heat emitting elements are disposed in a distributed manner, so that in a working process of the wireless charger, damage to the connector caused by heat concentration in the connector can be effectively avoided.

In a possible implementation of this application, the wireless charger further includes a third housing. The third housing is disposed between the first housing and the second housing. The first housing is connected to the third housing through the cable, and the second housing is connected to the third housing through the cable. In this implementation, the boost circuit may be disposed in the third housing, and the inverter circuit may be disposed in the first housing of the charging base. In some other possible implementations, both the boost circuit and the inverter circuit may be disposed in the third housing. According to this solution, heat emitting elements are disposed in a distributed manner, so that in a working process of the wireless charger, damage to the connector caused by heat concentration in the connector can be effectively avoided.

In addition, to further disperse the heat emitting elements, the wireless charger may further include a fourth housing. The fourth housing is disposed between the third housing and the first housing. The third housing is connected to the fourth housing through the cable, and the fourth housing is connected to the first housing through the cable. In this implementation, the boost circuit may be disposed in the third housing, and the inverter circuit may be disposed in the fourth housing. In this way, the transmitting coil can be separately disposed in the first housing of the charging base, the boost circuit can be separately disposed in the third housing, and the inverter circuit can be separately disposed in the fourth housing, to further reduce heat concentration in the wireless charger. This helps prolong a service life of the wireless charger.

According to a second aspect, this application further provides a wireless charging system. The wireless charging system includes an electronic device and a wireless charger. When the wireless charger is used to charge the electronic device, the wireless charger may be connected to a direct current power supply, and the to-be-charged electronic device is placed on a base of the wireless charger. In this way, the wireless charger is configured to transmit energy of the direct current power supply to the to-be-charged electronic device in an electromagnetic wave. The to-be-charged electronic device is configured to receive the electromagnetic wave, and charge the to-be-charged electronic device by using energy carried in the electromagnetic wave.

According to the wireless charging system in this application, a boost circuit can be used to boost a direct current voltage input to the wireless charger through a connector, so that when charging power is effectively increased, a current flowing through a power supply circuit of the wireless charger can be low, and heat consumption of a transmitting coil can be effectively reduced. In addition, in this application, the boost circuit is disposed outside a first housing of the charging base. When the wireless charger is used to charge the to-be-charged electronic device, total heat consumption generated by a heat emitting element in the charging base that is in direct contact with the to-be-charged electronic device is low, and temperature rise of the charging base is slow. This can avoid triggering thermal protection that limits charging of the charging base, and effectively improve efficiency of charging the electronic device by using the wireless charger. In addition, when the wireless charger is used to charge the electronic device, discomfort generated when a user touches the electronic device or the wireless charger can be reduced, to improve charging security of the wireless charger, and improve charging experience of the user.

REFERENCE NUMERALS

1: wireless charger; 101: inverter circuit; 1011: DC/AC conversion module; 1012: first matching circuit;
1013: first control unit; 102: transmitting coil; 103: direct current power supply; 104: boost circuit; 11: charging base;
11: first housing; 12: connector; 121: second housing; 122: connector interface; 13: cable; 14: third housing;
15: third housing; 2: electronic device; 201: powered circuit; 2011: second matching circuit;
2012: AC/DC conversion module; 2013: second control unit; 202: receiving coil; and 203: load.

DETAILED DESCRIPTION OF ILLUSTRATIVE EMBODIMENTS

To make the objectives, technical solutions, and advantages of this application clearer, the following further describes this application in detail with reference to the accompanying drawings. For ease of understanding of a wireless charger provided in embodiments of this application, the following first describes an application scenario for the wireless charger.

With great development and popularization of consumer electronic products, portable electronic products bring great convenience to people's life. However, different charging adapters need to be configured for different products. Because interfaces of different products cannot be shared, power of different products is incompatible, and the like, adapters of different manufacturers have poor universality. In addition, wired charging that requires a large quantity of wires and cable plug/unplug during charging greatly reduces convenience for a user.

With development of science and technology, a wireless charging technology is applied more and more widely in the consumer electronic products. Compared with a conventional cable plug-in electric energy transmission technology, in a radio energy transmission process, the wireless charging technology is more secure, convenient, and reliable because of no cable connection between a power supply and a load. The wireless charging technology is used to implement radio energy transmission in the following manners: electromagnetic radiation, electromagnetic induction, electromagnetic resonance, electric field coupling, and the like. In consideration of efficiency and security, a wireless charging product in the market usually uses a radio energy transmission manner of electromagnetic induction.

Figure 1:
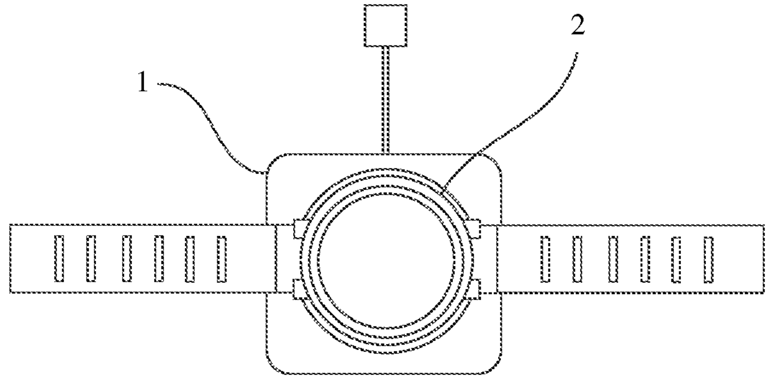
FIG. 1 is a schematic diagram of a structure of a wireless charging system according to an embodiment of this application.

A wireless charger 1 provided in this application is designed based on the radio energy transmission manner of electromagnetic induction, and may be applied to various wireless charging systems. FIG. 1 shows a wireless charging system including the wireless charger 1 and an electronic device 2. In the wireless charging system, the wireless charger 1 is used as a power supply device, and the electronic device 2 is used as a powered device. The electronic device 2 may be but is not limited to a low-power wearable electronic device like a smart band, a smartwatch, a smart ring, smart glasses, or a smart headset.

In the embodiment shown in FIG. 1, an example in which the electronic device 2 is a smartwatch is used. The wireless charger 1 may be connected to a direct current power supply, and is configured to send energy of the direct current power supply to the to-be-charged electronic device 2 in an electromagnetic wave. The to-be-charged electronic device 2 is in contact with the wireless charger 1, and is configured to receive the electromagnetic wave, and charge the to-be-charged electronic device 2 by using energy carried in the electromagnetic wave.

Figure 2:
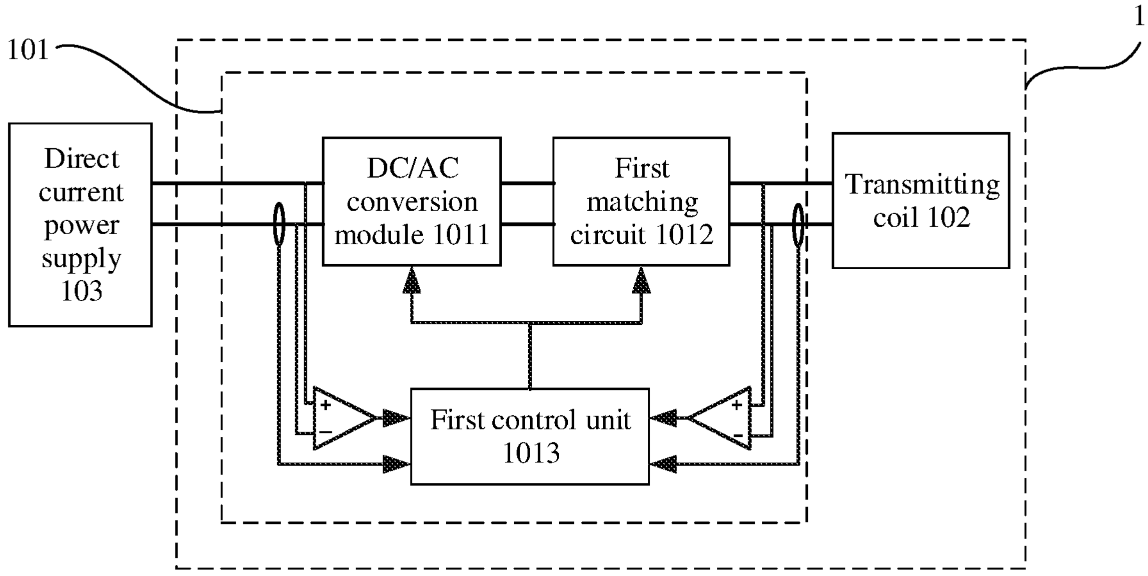
FIG. 2 is a schematic diagram of a structure of an inverter circuit of a wireless charger according to an embodiment of this application.

FIG. 2 provides a schematic diagram of a circuit structure of the wireless charger 1. Still as shown in FIG. 2, the wireless charger 1 may include a power supply circuit and a transmitting coil 102. Still as shown in FIG. 2, the power supply circuit of the wireless charger 1 mainly includes an inverter circuit 101, and the inverter circuit 101 may include a direct current/alternating current (DC/AC) conversion module 1011, a first matching circuit 1012, and a first control unit 1013. In this way, when the wireless charger 1 supplies power to a powered device, the DC/AC conversion module 1011 is connected to the direct current power supply 103, and converts a direct current voltage signal into an alternating current voltage signal. The alternating current voltage signal flows through the first matching circuit 1012 and is transmitted to the transmitting coil 102. The transmitting coil 102 converts electric energy of the alternating current voltage signal into electromagnetic energy for wireless transmission. In addition, the first control unit 1013 may control operation of the power supply circuit.

Figure 3:
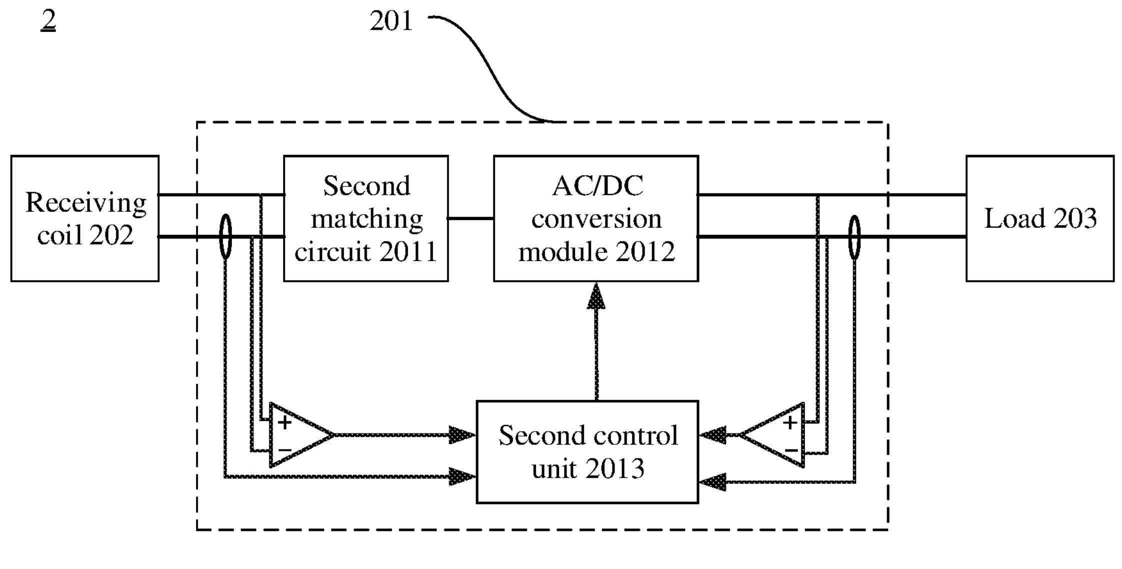
FIG. 3 is a schematic diagram of a structure of a powered circuit of an electronic device according to an embodiment of this application.

In addition, FIG. 3 provides a schematic diagram of a circuit structure of the electronic device 2. The electronic device 2 may include a powered circuit 201, a receiving coil 202, and a load 203. The powered circuit 201 may include a second matching circuit 2011, an alternating current/direct current (AC/DC) conversion module 2012, and a second control unit 2013. The receiving coil 202 may convert a received electromagnetic wave signal into electric energy. The electric energy is transmitted to the AC/DC conversion module 2012 by using the second matching circuit 2011. The AC/DC conversion module 2012 converts a received alternating current signal into a direct current signal for storage or supplying power to the load 203. In addition, the second control unit 2013 may control operation of the powered circuit 201.

A watch has limited space in a watch body, and therefore allows a receiving coil 202 with a severely restricted size (which includes an area and a thickness of the receiving coil 202). Consequently, the receiving coil 202 has such low performance that it is prone to generate heat in a charging process. Currently, when the wireless charger 1 charges the watch, a direct current voltage output from an adapter is usually 5 V. For example, the watch needs to be charged with a power of 3 W. A test finds that a loss of a single receiving coil 202 accounts for more than 30% of total heat consumption on an entire watch. However, to avoid overheating of the watch body in the charging process for satisfied user experience in a charging state, when the watch reaches a temperature, thermal protection is triggered to limit charging of the watch. This prolongs charging duration of the watch, and deteriorates charging experience.

As wireless charging is gradually popularized in low-power electronic devices, charging power of wireless charging is gradually increased. Because charging power=voltage×current, when a direct current voltage received from the wireless charger 1 is constant, the charging power can be increased only by increasing a current. However, as the current increases, heat consumption of the entire wireless charging system accordingly increases, and heat consumption on the coil further increases sharply (coil loss=coil current×coil current×coil alternating current impedance, that is, the coil loss is in direct proportion to a square of the coil current). This becomes a main bottleneck of charging power improvement.

In addition, if the charging power of the wireless charging system needs to be increased without changing the coil size, a high-voltage low-current solution (that is, a charging power requirement of the wireless charging system is met by increasing a voltage and reducing a current) may be considered to implement charging. For example, the watch is charged with the power of 3 W. If the direct current voltage received from the wireless charger 1 can be boosted to 9 V for charging, heat consumption of the coil can be reduced by nearly 70%, and charging duration can be effectively reduced.

The wireless charger in this application is proposed based on a high-voltage low-current charging solution, and is intended to improve charging efficiency of the wireless charging system and reduce heat consumption, to improve user experience.

Figure 4:
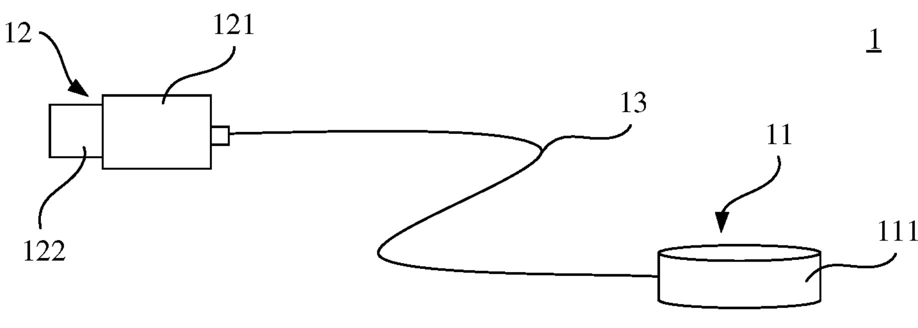
FIG. 4 is a schematic diagram of a structure of a wireless charger according to an embodiment of this application.

FIG. 4 is a schematic diagram of a structure of the wireless charger 1 according to an embodiment of this application. It can be seen from FIG. 4 that the wireless charger 1 in this embodiment of this application may include a charging base 11, a connector 12, and a cable 13. The charging base 11 is in communication connection with the connector 12 through the cable 13. The charging base 11 has a first housing 111. The charging base 11 may be configured to carry the to-be-charged electronic device 2 shown in FIG. 1, and is configured to implement electromagnetic coupling between the wireless charger 1 and the electronic device 2, so that the wireless charger 1 charges the electronic device 2.

Still as shown in FIG. 4, when the connector 12 is specifically disposed, the connector 12 may be but is not limited to a micro USB connector, a Type-A connector, a Type-C connector, or the like. The connector 12 has a second housing 121 and a connector interface 122. A part or all of the connector interface 122 is disposed in the second housing 121. For example, in the embodiment shown in FIG. 4, a part of the connector interface 122 is disposed in the second housing 121. In addition, the connector interface 122 of the connector 12 may be directly inserted into a charging interface, or may be electrically connected to the charging interface after being inserted into an adapter, but is not limited thereto, to connect the connector 12 to a direct current power supply.

Figure 5:
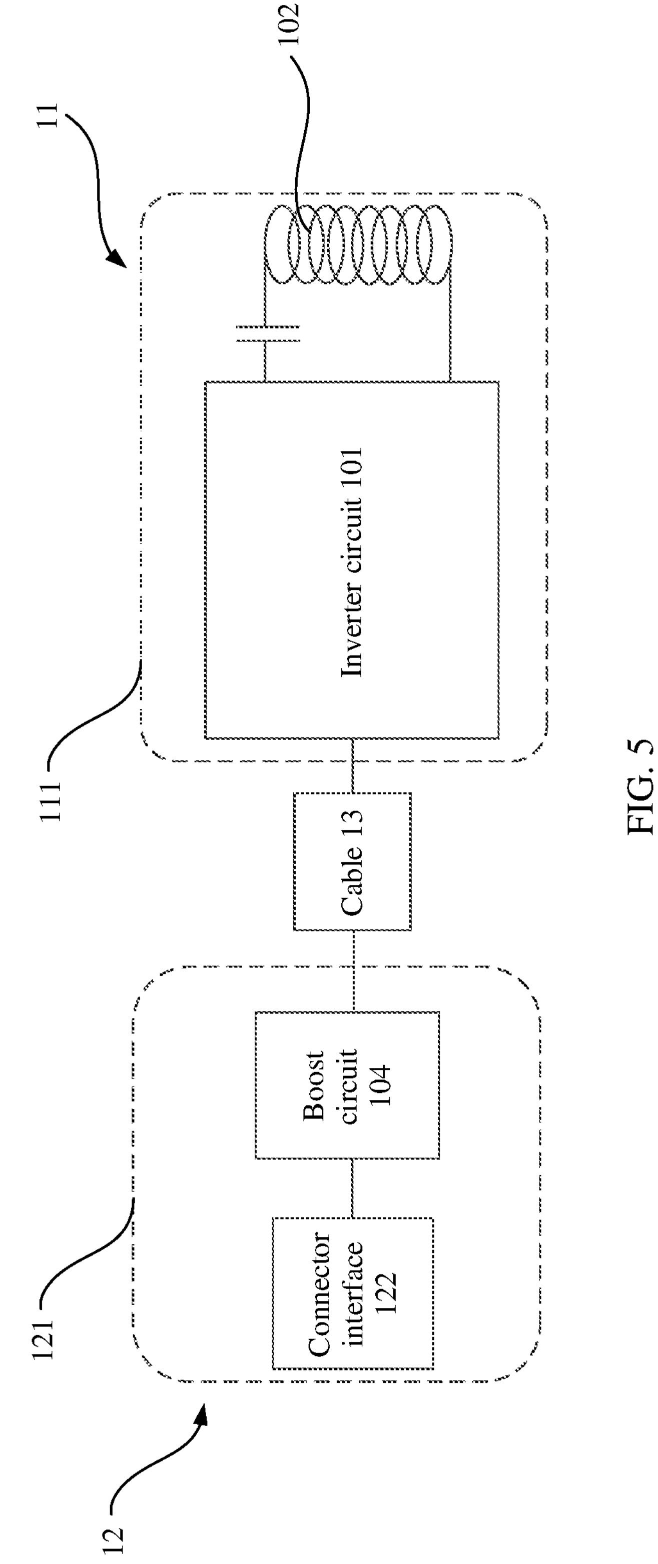
FIG. 5 is a schematic diagram of a structure of a wireless charger according to another embodiment of this application.

FIG. 5 is a schematic diagram of a structure of the wireless charger 1 according to an embodiment of this application. The wireless charger 1 in this embodiment of this application is used as a power supply device, and may further include a transmitting coil 102, an inverter circuit 101, and a boost circuit 104. The transmitting coil 102 may convert electric energy into electromagnetic energy for wireless transmission. Therefore, in this embodiment of this application, the transmitting coil 102 may be disposed in a first housing 111 of a charging base 11.

In addition, in this embodiment of this application, when the inverter circuit 101 is specifically disposed, as shown in FIG. 2, the inverter circuit 101 may include, but is not limited to, the DC/AC conversion module 1011, the first matching circuit 1012, and the first control unit 1013. The DC/AC conversion module 1011 may be connected to the direct current power supply 103, and convert the direct current power supply 103 into an alternating current signal. In addition, the first control unit 1013 may be, for example, a transmitter chip, and the first control unit 1013 may control operation of the inverter circuit 101.

Because the alternating current signal obtained through conversion by the inverter circuit 101 is transmitted to the transmitting coil 102, as shown in FIG. 4 and FIG. 5, in some embodiments of this application, the inverter circuit 101 may be disposed in the first housing 111 of the charging base 11, and the inverter circuit 101 is electrically connected to the transmitting coil 102.

As a key part of the wireless charger 1 in embodiments of this application, the boost circuit 104 may be configured to boost a direct current voltage input through a connector. Therefore, the boost circuit 104 may be disposed close to the connector 12. As shown in FIG. 5, in a possible embodiment of this application, the boost circuit 104 may be disposed in a second housing 121 of the connector 12, and the boost circuit 104 is electrically connected to a connector interface 122. In addition, still as shown in FIG. 5, the boost circuit 104 may be disposed between the connector interface 122 and the inverter circuit 101, so that the inverter circuit 101 can convert a direct current voltage signal boosted by the boost circuit 104.

Figure 6:
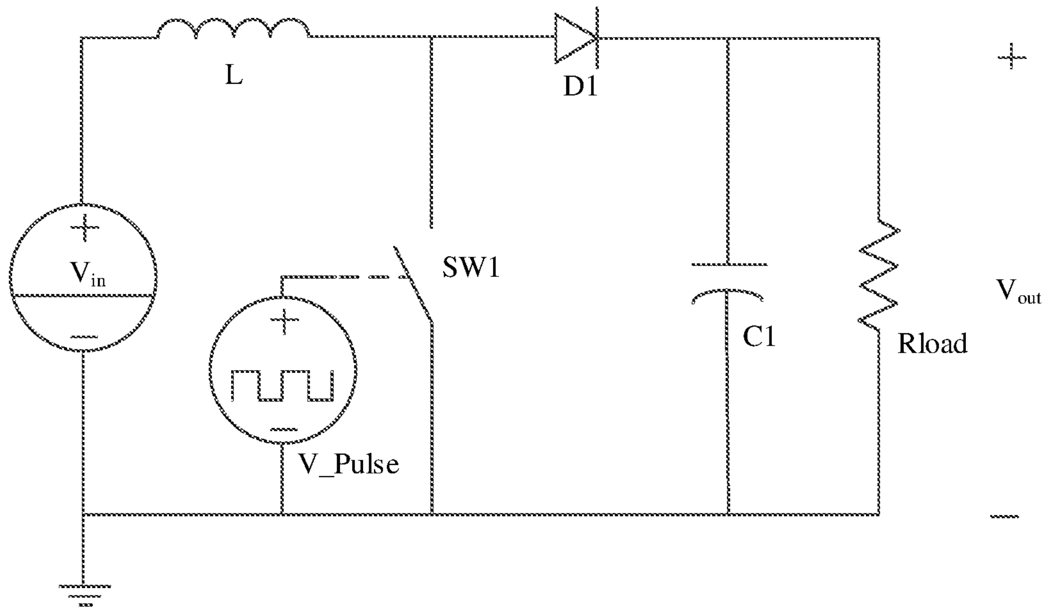
FIG. 6 is a schematic diagram of a structure of a boost circuit according to an embodiment of this application.

As shown in FIG. 6, in a possible embodiment of this application, a boost principle of the boost circuit 104 is described by using an example in which the boost circuit 104 is a boost chopper circuit. When a switch device works in an on state, an inductor L stores energy, and an inductive current $i_l$ of the inductor L rises at a slope of $V_{in}/L$. An anode potential of a diode D1 is equal to an earth level, and a cathode potential is equal to an output voltage value. Therefore, D1 is reverse-biased, and a capacitor C1 provides an output current for a load. For an equivalent circuit, refer to FIG. 7A.

Figure 7A:
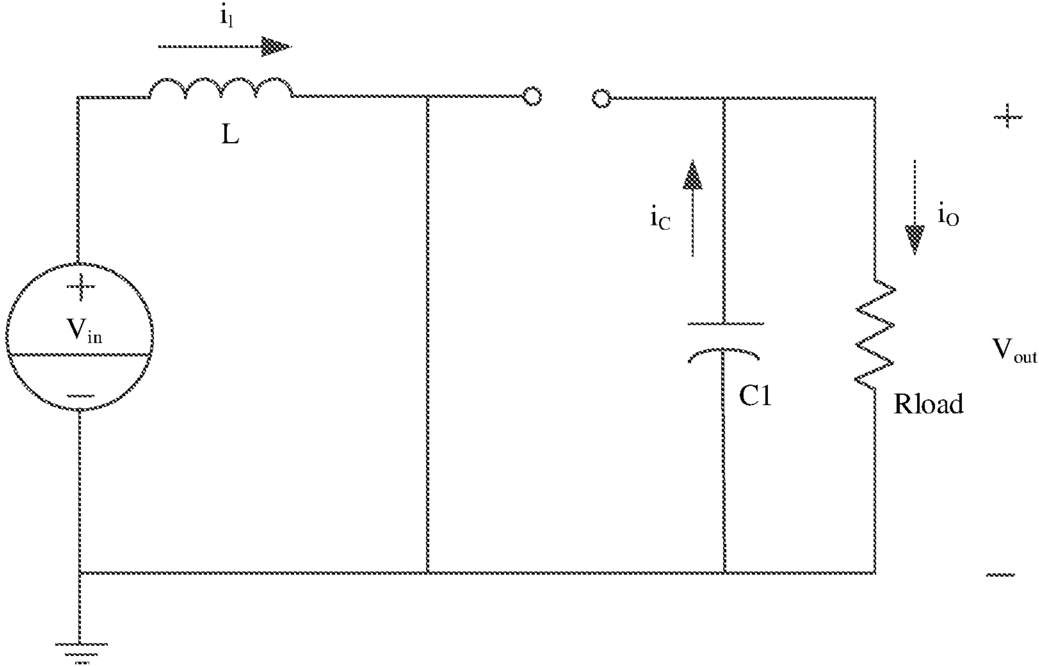
FIG. 7A is a schematic diagram of a structure of an equivalent circuit of a boost circuit according to an embodiment of this application.

In an embodiment shown in FIG. 7A, voltages at two terminals of an inductor L are $V_{L(t)}=V_{in}$.

The inductive current $i_l$ rises by $\Delta I_{on}=V_{in}/L\times D\times T_s$, where $T_s$ is duration of a switching cycle, and D is a duty cycle of conduction duration to a switching cycle.

However, when the switch device works in an off state, because the inductive current $i_l$ cannot change abruptly, the inductor L generates an inductive voltage in a reverse direction, so that D1 is forward conducted, the energy stored in the inductor L provides an output current $i_O$ for the load, and charges the capacitor C1 at a current $i_C$ at the same time. The inductive current $i_l$ decreases at a slope of $(V_{out}-V_{in})/L$. For an equivalent circuit, refer to FIG. 7B.

Figure 7B:
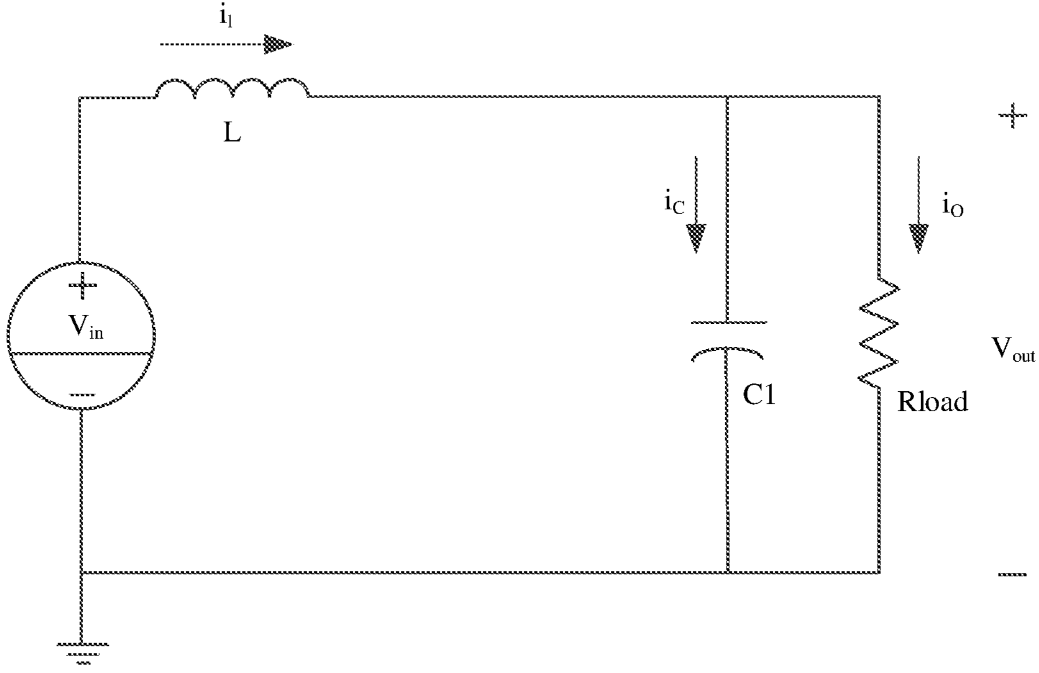
FIG. 7B is a schematic diagram of a structure of an equivalent circuit of a boost circuit according to another embodiment of this application.

In an embodiment shown in FIG. 7B, voltages at two terminals of an inductor are $V_{L(t)}=-(V_{out}-V_{in})$.

The inductive current $i_l$ decreases by $\Delta I_{off}=(V_{out}-V_{in})/L\times(1-D)\times Ts$.

Because a converter is in a steady state, $\Delta I_{on}=\Delta I_{off}$.

Therefore, $V_{in}/L\times D\times T_s=(V_{out}-V_{in})/L\times(1-D)\times T_s$.

Therefore, it can be learned that a relationship between an output voltage $V_{out}$ and an input voltage $V_{in}$ is: $V_{out}/V_{in}=1/(1-D)$. It can be learned from the formula that $V_{out}$ is already higher than $V_{in}$, thereby implementing voltage boosting.

It may be understood that the description of the boost principle of the boost circuit 104 in the foregoing embodiments is merely some descriptions of examples provided in this application. In some possible embodiments, any other possible boost circuit 104 may be used, provided that a direct current voltage input through the connector 12 can be boosted. This falls within the protection scope of this application. Details are not described herein.

Figure 8A:
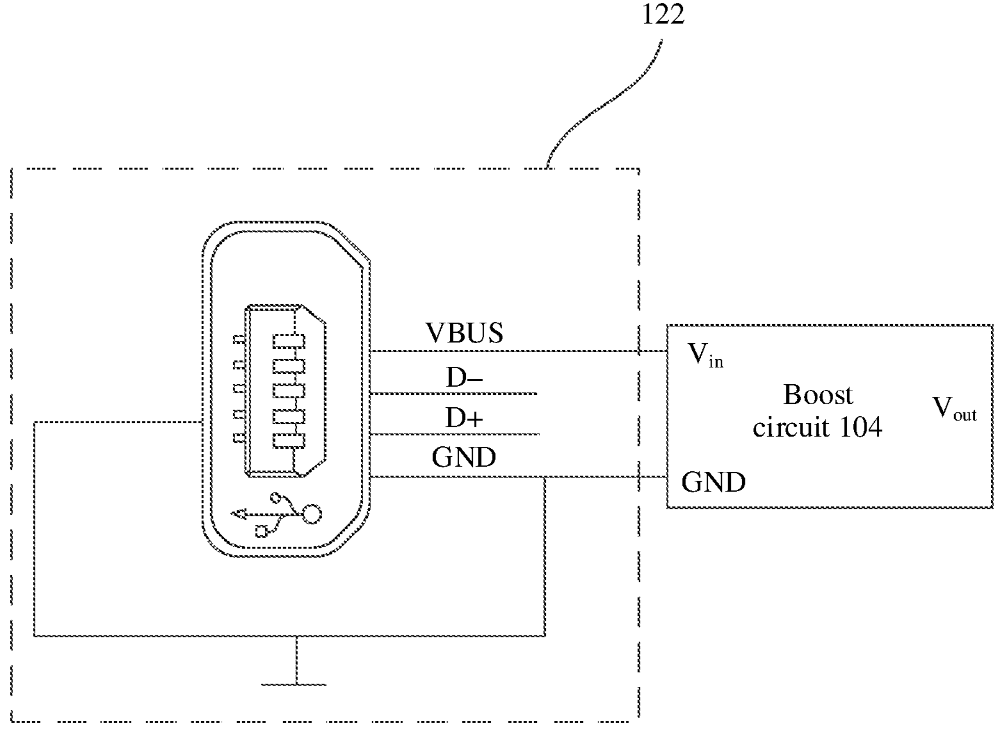
FIG. 8A is a schematic diagram of a circuit structure in which a boost circuit is connected to a connector according to an embodiment of this application.

When the boost circuit 104 is specifically connected to the connector interface 122, refer to FIG. 8A. FIG. 8A is a schematic diagram of a circuit structure in which the boost circuit 104 is connected to the connector interface 122 when the connector interface 122 is of a Type-A. An input voltage ($V_{in}$) terminal of the boost circuit 104 is connected to a power cable (VBUS) of the Type-A, and a ground terminal (GND) of the boost circuit 104 is connected to a ground terminal (GND) of the Type-A, so that the boost circuit 104 boosts a direct current voltage input through the connector interface 122.

Figure 8B:
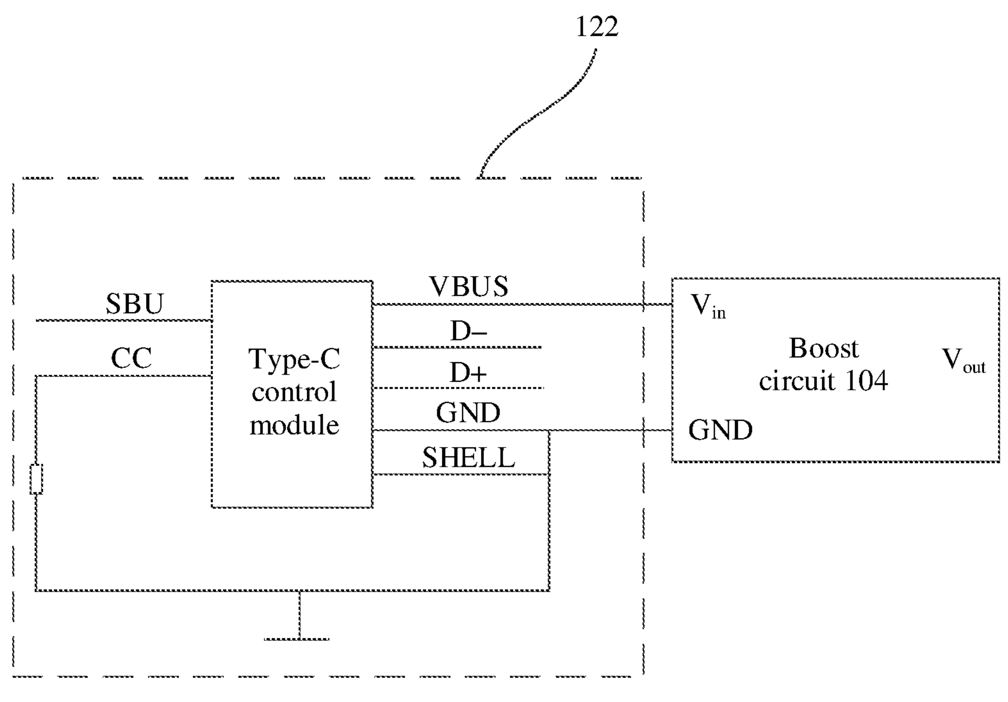
FIG. 8B is a schematic diagram of a circuit structure in which a boost circuit is connected to a connector according to another embodiment of this application.

In addition, FIG. 8B is a schematic diagram of a circuit structure in which the boost circuit 104 is connected to the connector interface 122 when the connector interface 122 is of a Type-C. An input voltage ($V_{in}$) terminal of the boost circuit 104 is connected to a power cable (VBUS) of the Type-C, and a ground terminal (GND) of the boost circuit 104 is connected to a ground terminal (GND) of the Type-C, so that the boost circuit 104 boosts a direct current voltage input through the connector interface 122.

For the wireless charger 1 in the foregoing embodiments of this application, the boost circuit 104 is disposed to boost the direct current voltage input to the wireless charger 1 through the connector. In this way, a current flowing through the power supply circuit of the wireless charger 1 can be low when the charging power is effectively increased, so that heat consumption of the transmitting coil 102 can be effectively reduced. In addition, as shown in FIG. 5, in this embodiment of this application, the inverter circuit 101 and the transmitting coil 102 are disposed in the first housing in of the charging base 11, and the boost circuit 104 is disposed in the second housing 121 of the connector 12. In this case, when the wireless charger 1 is used to charge a low-power electronic device like a smartwatch, a smart band, or smart glasses, total heat consumption generated by the transmitting coil 102 and the inverter circuit 101 in the charging base 11 that is in direct contact with the to-be-charged electronic device is low, and temperature rise of the charging base 11 is slow. This can avoid triggering thermal protection that limits charging of the charging base 11, and effectively reduce charging duration. In addition, when the wireless charger 1 is used to charge the electronic device 2, discomfort generated when a user touches the electronic device 2 or the wireless charger 1 can be reduced, to improve charging security of the wireless charger 1, and improve charging experience of the user.

Figure 9:
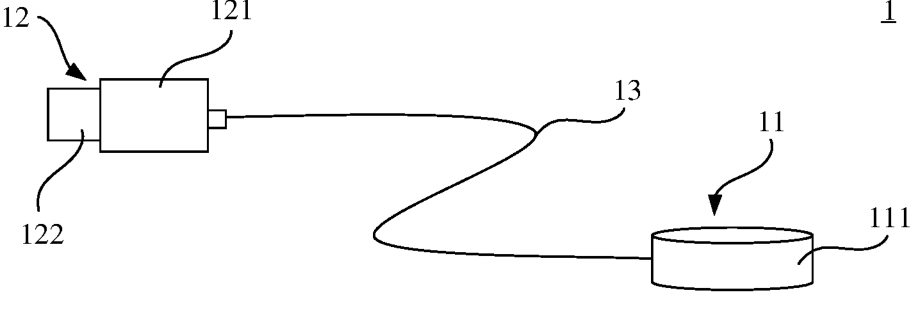
FIG. 9 is a schematic diagram of a structure of a wireless charger according to another embodiment of this application.
Figure 10:
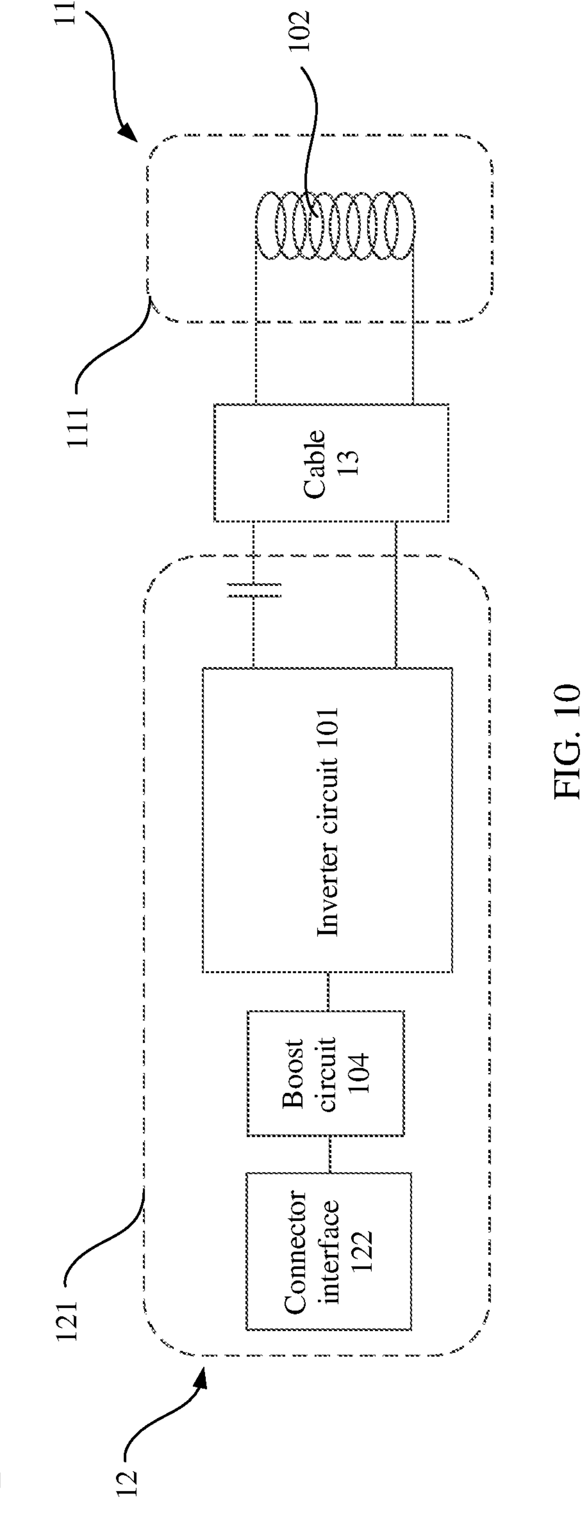
FIG. 10 is a schematic diagram of a structure of a wireless charger according to another embodiment of this application.

In some other embodiments of this application, when the wireless charger 1 is specifically disposed, to reduce heat generated at the charging base 11, as shown in FIG. 9 and FIG. 10, a heat emitting element: a transmitting coil 102 may be further separately disposed in a first housing 111 of a charging base 11, and both a boost circuit 104 and an inverter circuit 101 are disposed in a second housing 121 of a connector 12.

As shown in FIG. 9 and FIG. 10, in embodiments of this application, for a specific disposition manner of the inverter circuit 101 and the boost circuit 104, refer to the foregoing embodiments. Details are not described herein again. In addition, as a key part of the wireless charger 1 in embodiments of this application, the boost circuit 104 may be configured to boost a direct current voltage input through the connector 12. Therefore, after both the inverter circuit 101 and the boost circuit 104 are disposed in the second housing 121, the boost circuit 104 may be disposed close to a connector interface 122, and the boost circuit 104 is electrically connected to the connector interface 122.

Still as shown in FIG. 10, in this embodiment of this application, the boost circuit 104 may be disposed between the connector interface 122 and the inverter circuit 101, so that the inverter circuit 101 can convert a signal that is boosted by the boost circuit 104 and that is of a direct-current power supply 103.

For the wireless charger 1 in the foregoing embodiments of this application, the boost circuit 104 is disposed to boost the direct current voltage input to the wireless charger 1 through the connector. In this way, a current flowing through the power supply circuit of the wireless charger 1 can be low when the charging power is effectively increased, so that heat consumption of the transmitting coil 102 can be effectively reduced. In addition, in embodiments of this application, the transmitting coil 102 is disposed in the first housing 111 of the charging base 11, and the boost circuit 104 and the inverter circuit 101 are disposed in the second housing 121 of the connector. In this case, when the wireless charger 1 is used to charge a low-power electronic device like a smartwatch, a smart band, or smart glasses, total heat consumption generated by the transmitting coil 102 in the charging base 11 that is in direct contact with the to-be-charged electronic device is low, and temperature rise of the charging base 11 is slow. This can avoid triggering thermal protection that limits charging of the charging base 11, and effectively reduce charging duration. In addition, when the wireless charger 1 is used to charge the electronic device 2, discomfort generated when a user touches the electronic device 2 or the wireless charger 1 can be reduced, to improve charging security of the wireless charger 1, and improve charging experience of the user.

Figure 11:
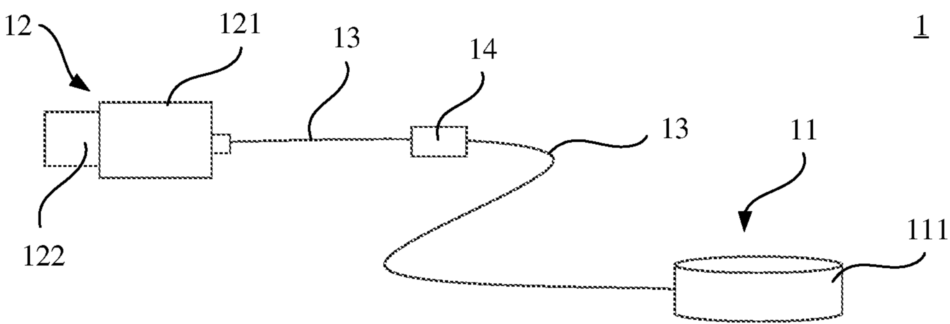
FIG. 11 is a schematic diagram of a structure of a wireless charger according to another embodiment of this application.

In addition to the foregoing disposition manner, as shown in FIG. 11, the wireless charger 1 in this application may further include a third housing 14. The third housing 14 is disposed between a first housing 111 and a second housing 121. In addition, both the first housing 111 and the third housing 14, and the third housing 14 and the second housing 121 may be electrically connected through a cable 13.

Figure 12:
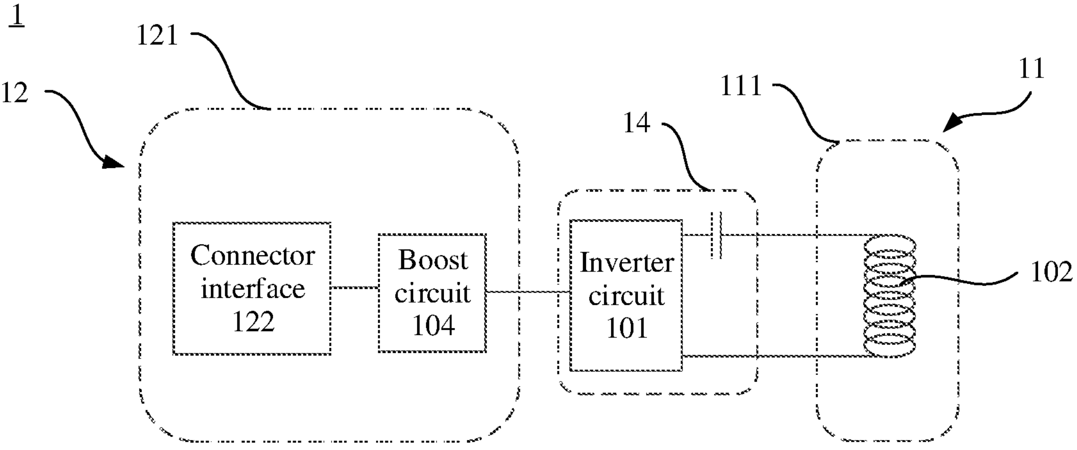
FIG. 12 is a schematic diagram of a structure of a wireless charger according to another embodiment of this application.

As shown in FIG. 11 and FIG. 12, in embodiments of this application, it is considered that a boost circuit 104 and an inverter circuit 101 include a large quantity of heat emitting elements, heat consumption is high. Therefore, to avoid damage to a connector 12 of the wireless charger 1 caused by heat concentration, the inverter circuit 101 may be disposed in the third housing 14. In this case, the boost circuit 103 is disposed in the second housing 121 of the connector 12, and a transmitting coil 102 is separately disposed in the first housing 111 of a charging base 11. In this way, the boost circuit 104 can boost a direct current voltage input through a connector interface 122, and then the inverter circuit 101 converts a direct current power supply boosted by the boost circuit 104, to implement an objective of charging with a high voltage and a low current by using the wireless charger 1.

For the wireless charger 1 in the foregoing embodiments of this application, the boost circuit 104 is disposed to boost a direct current voltage input to the wireless charger 1 through the connector 12, so that when charging power is effectively increased, a current flowing through a power supply circuit of the wireless charger 1 can be low, and heat consumption of the transmitting coil 102 can be effectively reduced. In addition, in embodiments of this application, the transmitting coil 102 is separately disposed in the first housing 111 of the charging base 11, the boost circuit 104 is disposed in the second housing 121 of the connector, and the inverter circuit 101 is separately disposed in the third housing 14. The heat emitting elements are disposed in a distributed manner, so that in a working process of the wireless charger 1, damage to the connector 12 caused by heat concentration in the connector 12 can be effectively avoided.

When the wireless charger 1 is used to charge a low-power electronic device like a smartwatch, a smart band, or smart glasses, total heat consumption generated by the transmitting coil 102 in the charging base 11 that is in direct contact with the to-be-charged electronic device is low, and temperature rise of the charging base 11 is slow. This can avoid triggering thermal protection that limits charging of the charging base 11, and effectively reduce charging duration. In addition, when the wireless charger 1 is used to charge an electronic device 2, discomfort generated when a user touches the electronic device 2 or the wireless charger 1 can be reduced, to improve charging security of the wireless charger 1, and improve charging experience of the user.

Figure 13:
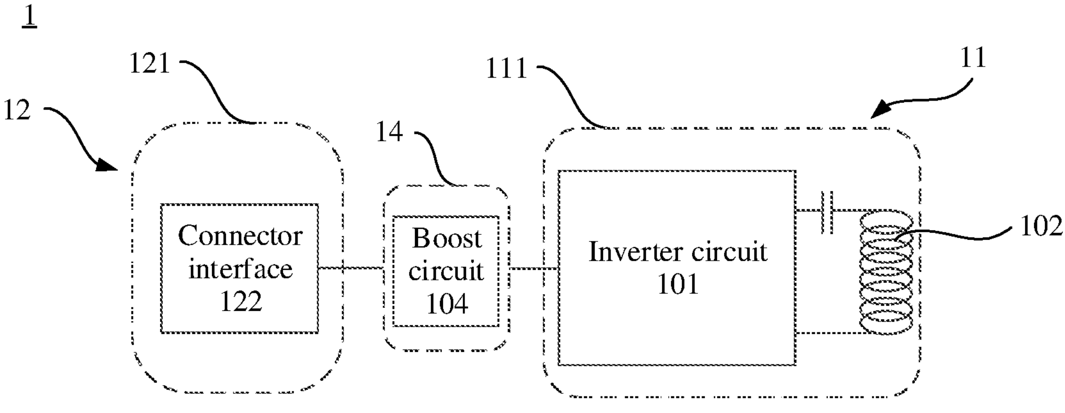
FIG. 13 is a schematic diagram of a structure of a wireless charger according to another embodiment of this application.

In some embodiments of this application, it is expected that heat generated at the connector 12 is small enough. In this case, it is considered that the boost circuit 104 is disposed outside the second housing 121 of the connector 12. For example, as shown in FIG. 13, in a possible embodiment of this application, a boost circuit 104 may be disposed in a third housing 14. In this case, an inverter circuit 101 is disposed in a first housing 111 of a charging base 11. In this way, the boost circuit 104 can boost a direct current voltage input through a connector interface 122, and then the inverter circuit 101 converts a direct current power supply boosted by the boost circuit 104, to implement an objective of charging with a high voltage and a low current by using the wireless charger 1.

For the wireless charger 1 in the foregoing embodiment of this application, the boost circuit 104 is disposed to boost a direct current voltage input to the wireless charger 1 through a connector, so that when charging power is effectively increased, a current flowing through a power supply circuit of the wireless charger 1 can be low, and heat consumption of a transmitting coil 102 can be effectively reduced. In addition, as shown in FIG. 13, in this embodiment of this application, the inverter circuit 101 and the transmitting coil 102 are disposed in the first housing 111 of the charging base 11, and the boost circuit 104 is separately disposed in the third housing. Heat emitting elements are disposed in a distributed manner, so that in a working process of the wireless charger 1, damage to the connector 12 caused by excessively high heat in the connector 12 can be effectively avoided.

When the wireless charger 1 is used to charge a low-power electronic device like a smartwatch, a smart band, or smart glasses, total heat consumption generated by the transmitting coil 102 and the inverter circuit 101 in the charging base 11 that is in direct contact with the to-be-charged electronic device is low, and temperature rise of the charging base 11 is slow. This can avoid triggering thermal protection that limits charging of the charging base 11, and effectively reduce charging duration. In addition, when the wireless charger 1 is used to charge an electronic device 2, discomfort generated when a user touches the electronic device 2 or the wireless charger 1 can be reduced, to improve charging security of the wireless charger 1, and improve charging experience of the user.

Figure 14:
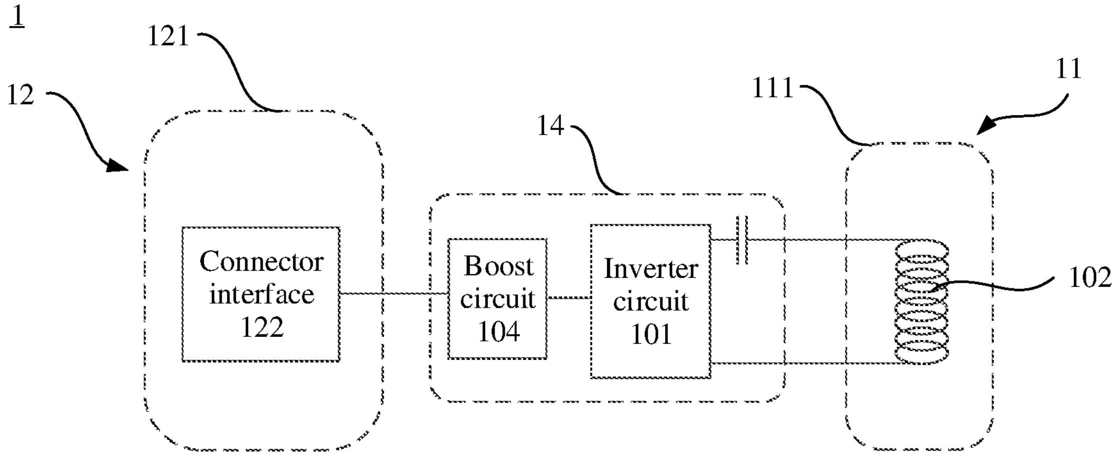
FIG. 14 is a schematic diagram of a structure of a wireless charger according to another embodiment of this application.

When the wireless charger 1 includes the third housing 14, in addition to the disposition manner in the foregoing embodiment, as shown in FIG. 14, both a boost circuit 104 and an inverter circuit 102 may be disposed in a third housing. By using this embodiment, heat emitting elements can be dispersed, to avoid a problem of heat concentration in a connector 12 and a charging base 11.

Figure 15:
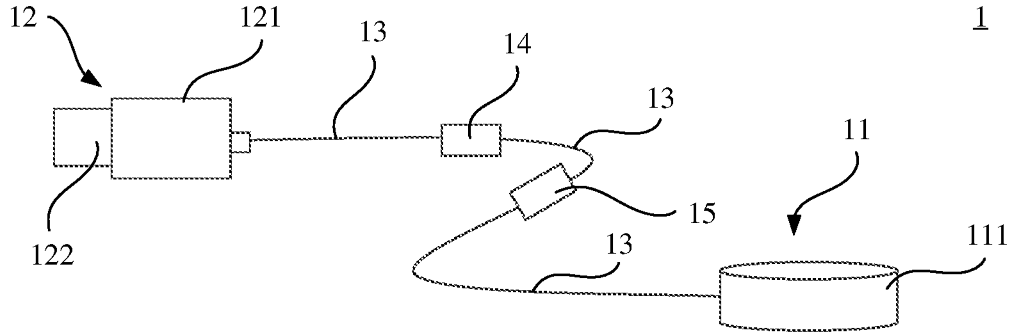
FIG. 15 is a schematic diagram of a structure of a wireless charger according to another embodiment of this application.

In some other embodiments of this application, as shown in FIG. 15, the wireless charger 1 may further include a fourth housing 15, the fourth housing 15 is disposed between a third housing 14 and a first housing 111, the third housing 14 may be connected to the fourth housing 15 through a cable 13, and the fourth housing 15 may be connected to the first housing 111 through the cable 13.

Figure 16:
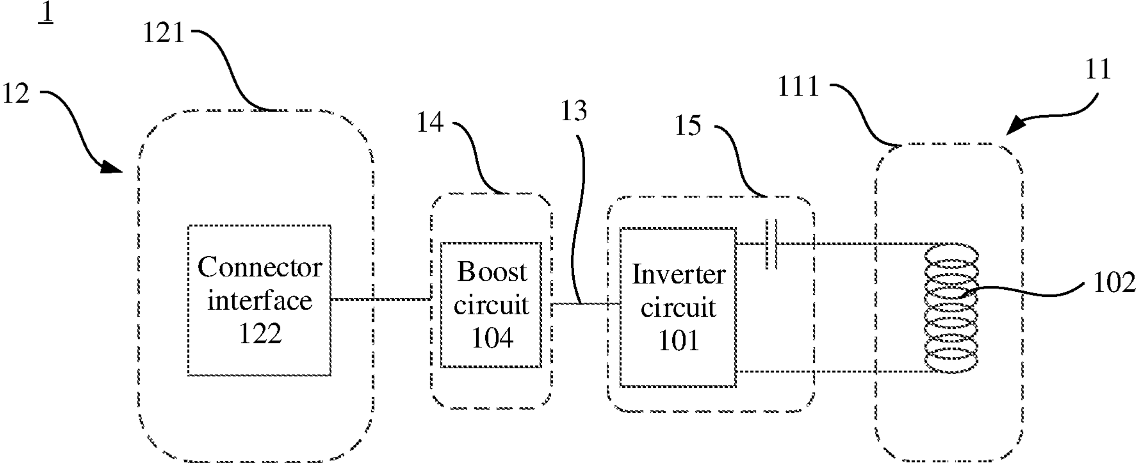
FIG. 16 is a schematic diagram of a structure of a wireless charger according to another embodiment of this application.

As shown in FIG. 16, in this embodiment, a boost circuit 104 may be separately disposed in a third housing 14, and an inverter circuit 101 may be separately disposed in a fourth housing 15. In this way, the boost circuit 104 can boost a direct current voltage input through a connector interface 122, and then the inverter circuit 101 converts a direct current power supply boosted by the boost circuit 104, to implement an objective of charging with a high voltage and a low current by using the wireless charger 1.

For the wireless charger 1 in the foregoing embodiments of this application, the boost circuit 104 is disposed to boost a direct current voltage input to the wireless charger 1 through a connector 12, so that when charging power is effectively increased, a current flowing through a power supply circuit of the wireless charger 1 can be low, and heat consumption of a transmitting coil 102 can be effectively reduced. In addition, in embodiments of this application, the transmitting coil 102 is separately disposed in the first housing 111 of a charging base 11, the boost circuit 104 is separately disposed in the third housing 14, and the inverter circuit 101 is separately disposed in the fourth housing 15. Heat emitting elements are disposed in a distributed manner, so that in a working process of the wireless charger 1, damage to the wireless charger 1 caused by heat concentration can be effectively avoided.

When the wireless charger 1 is used to charge a low-power electronic device like a smartwatch, a smart band, or smart glasses, total heat consumption generated by the transmitting coil 102 in the charging base 11 that is in direct contact with the to-be-charged electronic device is low, and temperature rise of the charging base 11 is slow. This can avoid triggering thermal protection that limits charging of the charging base 11, and effectively reduce charging duration. In addition, when the wireless charger 1 is used to charge an electronic device 2, discomfort generated when a user touches the electronic device 2 or the wireless charger 1 can be reduced, to improve charging security of the wireless charger 1, and improve charging experience of the user.

Clearly, a person skilled in the art can make various modifications and variations to embodiments of this application without departing from the spirit and scope of embodiments of this application. In this case, this application is intended to cover these modifications and variations of embodiments of this application provided that they fall within the scope of protection defined by the following claims and their equivalent technologies.

What is claimed is:

1. A wireless charger for a wearable device, comprising:

a charging base, comprising a first housing and a transmitting coil disposed in the first housing, wherein the transmitting coil is configured to convert electric energy of an alternating current voltage signal into electromagnetic energy for wireless transmission;

a connector, comprising a connector interface and a second housing, wherein a part or all of the connector interface is disposed in the second housing, and the connector is configured to be directly connected to a direct current power supply;

a cable, wherein the charging base is connected to the connector through the cable;

a boost circuit disposed outside the first housing, wherein the boost circuit is configured to boost a direct current voltage signal input through the connector, to generate a boosted direct-current voltage signal; and an inverter circuit, disposed between the boost circuit and the transmitting coil, wherein the inverter circuit is configured to convert the boosted direct-current voltage signal into the alternating current voltage signal, and transmit the alternating current voltage signal to the transmitting coil, and wherein the inverter circuit is located within the first housing or outside of the first housing.

2. The wireless charger according to claim 1, wherein the boost circuit is disposed in the second housing, and the boost circuit is electrically connected to the connector interface.

3. The wireless charger according to claim 2, wherein the inverter circuit is disposed in the second housing.

4. The wireless charger according to claim 2, further comprising:

a third housing disposed between the first housing and the second housing, wherein the first housing is connected to the third housing through the cable, the second housing is connected to the third housing through another cable, and the inverter circuit is disposed in the third housing.

5. The wireless charger according to claim 1, wherein the inverter circuit is disposed in the first housing.

6. The wireless charger according to claim 1, further comprising:

a third housing disposed between the first housing and the second housing of the connector, wherein the first housing is connected to the third housing through the cable, the second housing is connected to the third housing through another cable, and the boost circuit is disposed in the third housing.

7. The wireless charger according to claim 6, wherein the inverter circuit is disposed in the first housing.

8. The wireless charger according to claim 6, further comprising:

a fourth housing disposed between the third housing and the first housing, wherein the third housing is connected to the fourth housing through the cable, the fourth housing is connected to the first housing through a third cable, and the inverter circuit is disposed in the fourth housing.

9. The wireless charger according to claim 6, wherein the inverter circuit is disposed in the third housing.

10. The wireless charger according to claim 1, wherein the connector is a micro USB connector, a Type-A connector, or a Type-C connector.

11. A wireless charging system, comprising:

an electronic device; and a wireless charger configured to be connected to a direct current power supply by using a connector, and configured to convert electric energy of the direct current power supply into an electromagnetic wave; and wherein the electronic device is configured to receive the electromagnetic wave and is charged by using energy of the electromagnetic wave; and wherein the wireless charger comprises:

a charging base, comprising a first housing and a transmitting coil disposed in the first housing, wherein the transmitting coil is configured to convert electric energy of an alternating current voltage signal into the electromagnetic wave;

the connector, wherein the connector comprises a connector interface and a second housing, and a part or all of the connector interface is disposed in the second housing, and the connector is configured to be directly connected to the direct current power supply;

a cable, wherein the charging base is connected to the connector through the cable;

a boost circuit disposed outside the first housing, wherein the boost circuit is configured to boost a direct current voltage signal input through the connector, to generate a boosted direct-current voltage signal; and an inverter circuit, disposed between the boost circuit and the transmitting coil, wherein the inverter circuit is configured to convert the boosted direct-current voltage signal into the alternating current voltage signal, and transmit the alternating current voltage signal to the transmitting coil, and wherein the inverter circuit is located within the first housing or outside of the first housing.

12. The wireless charging system according to claim 11, wherein the boost circuit is disposed in the second housing, and the boost circuit is electrically connected to the connector interface.

13. The wireless charging system according to claim 12, wherein the inverter circuit is disposed in the second housing.

14. The wireless charging system according to claim 12, wherein the wireless charger further comprises:

a third housing disposed between the first housing and the second housing, wherein the first housing is connected to the third housing through the cable, the second housing is connected to the third housing through another cable, and the inverter circuit is disposed in the third housing.

15. The wireless charging system according to claim 11, wherein the inverter circuit is disposed in the first housing.

16. The wireless charging system according to claim 11, wherein the wireless charger further comprises:

a third housing disposed between the first housing and the second housing of the connector, wherein the first housing is connected to the third housing through the cable, the second housing is connected to the third housing through another cable, and the boost circuit is disposed in the third housing.

17. The wireless charging system according to claim 16, wherein the inverter circuit is disposed in the first housing.

18. The wireless charging system according to claim 16, wherein the wireless charger further comprises:

a fourth housing disposed between the third housing and the first housing, wherein the third housing is connected to the fourth housing through the cable, the fourth housing is connected to the first housing through a third cable, and the inverter circuit is disposed in the fourth housing.

19. The wireless charging system according to claim 16, wherein the inverter circuit is disposed in the third housing.

20. The wireless charging system according to claim 11, wherein the connector is a micro USB connector, a Type-A connector, or a Type-C connector.

* * * * *